United States Patent
Cho et al.

(10) Patent No.: US 11,940,194 B2
(45) Date of Patent: Mar. 26, 2024

(54) POWER CONVERTING APPARATUS AND AIR CONDITIONER INCLUDING THE SAME

(71) Applicant: LG Electronics Inc., Seoul (KR)

(72) Inventors: Jinho Cho, Seoul (KR); Taeyoung Park, Seoul (KR); Jongwon Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 17/173,679

(22) Filed: Feb. 11, 2021

(65) Prior Publication Data
US 2021/0247120 A1  Aug. 12, 2021

(30) Foreign Application Priority Data

Feb. 11, 2020 (KR) .................. 10-2020-0016546

(51) Int. Cl.
*F25B 49/02* (2006.01)
*H02M 1/084* (2006.01)
(Continued)

(52) U.S. Cl.
CPC .......... *F25B 49/025* (2013.01); *F25B 49/022* (2013.01); *H02M 1/084* (2013.01); *H02M 3/156* (2013.01); *H02M 5/458* (2013.01); *H02P 5/46* (2013.01); *H02P 27/045* (2013.01); *H02P 27/08* (2013.01); *F25B 2600/021* (2013.01); *F25B 2600/024* (2013.01); *F25B 2600/11* (2013.01); *F25B 2700/151* (2013.01);
(Continued)

(58) Field of Classification Search
CPC .................. F25B 49/025; F25B 49/022; F25B 2600/021; F25B 2600/024; F25B 2600/11; F25B 2700/151; F25B 2700/171; H02M 1/084; H02M 3/156; H02M 5/458; H02P 5/46; H02P 27/045; H02P 27/08; H02P 2201/03; H02P 2201/07; H02P 2201/11
USPC .......................................................... 318/34
See application file for complete search history.

(56) References Cited

U.S. PATENT DOCUMENTS

2013/0147404 A1*  6/2013  Kim ..................... B60L 7/14
                                                              318/139
2017/0264232 A1*  9/2017  Iezawa ................... H02P 27/08

FOREIGN PATENT DOCUMENTS

KR  1020180092085  8/2018

OTHER PUBLICATIONS

Kim Sung Woo (KR 20180092085 A) "Power Transforming Apparatus And Air Conditioner Including The Same" Date Published Aug. 17, 2018 (Year: 2018).*

(Continued)

*Primary Examiner* — Jorge L Carrasquillo
(74) *Attorney, Agent, or Firm* — Fish & Richardson P.C.

(57) ABSTRACT

A power converting apparatus includes: a rectifying unit configured to rectify an input AC power, a buck converter that is configured to step down a voltage of the rectified power and that is configured to output DC power having the step down voltage, a first inverter that is connected to an output terminal of the buck converter and that is configured to convert the DC power into AC power to drive a first motor, a second inverter that is connected to the output terminal of the buck converter, that is disposed in parallel to the first inverter, and that is configured to convert the DC power into AC power to drive a second motor, and a converter controller configured to control an output voltage of the DC power of the buck converter.

20 Claims, 10 Drawing Sheets

(51) Int. Cl.
  *H02M 3/156* (2006.01)
  *H02M 5/458* (2006.01)
  *H02P 5/46* (2006.01)
  *H02P 27/04* (2016.01)
  *H02P 27/08* (2006.01)

(52) U.S. Cl.
  CPC .... *F25B 2700/171* (2013.01); *H02P 2201/03* (2013.01); *H02P 2201/07* (2013.01); *H02P 2201/11* (2013.01)

(56) References Cited

OTHER PUBLICATIONS

Lee Jong-wan Kim (KR 101936631 B1) "Motor Driving Device And Air Conditioner Including The Same" Date Published Jan. 9, 2019 (Year: 2019).*

Kim et al. (WO 2016089032 A1). "Motor Driving Device, an Air Conditioner Including Same and a Control Method Therefor" Date Published:Jun. 9, 2016 (Year: 2016).*

* cited by examiner

POWER CONVERTING APPARATUS AND AIR CONDITIONER INCLUDING THE SAME

CROSS-REFERENCE TO RELATED APPLICATIONS

This application claims priority to and the benefit of Korean Patent Application No. 10-2020-0016546, filed on Feb. 11, 2020. The disclosure of the prior application is incorporated by reference in its entirety.

BACKGROUND OF THE INVENTION

1. Field of the Invention

The present disclosure relates to a power converting apparatus and an air conditioner including the same, and more particularly, to a power converting apparatus capable of controlling a rectified voltage using a converter, and an air conditioner including the same.

2. Description of the Related Art

An air conditioner is installed to provide a more comfortable indoor environment to humans, by adjusting the indoor temperature and purifying the indoor air, by discharging cold and hot air into the room to create a comfortable indoor environment. In general, the air conditioner includes an indoor unit configured as a heat exchanger and installed indoor, and an outdoor unit configured by a compressor and a heat exchanger to supply refrigerant to the indoor unit.

The air conditioner has a power converting apparatus and operates by converting input power. The power converting apparatus is an apparatus that converts input power and supplies the converted power. Such a power converting apparatus may convert input power into power for driving a home appliance such as an air conditioner. For example, the power converting apparatus may convert AC power into DC power and supply the DC power to a load or drive a motor, or the like.

In order to control a compressor motor and a fan motor, a conventional air conditioner uses the voltage of AC input terminal of the power converting apparatus in common, or uses the voltage of DC terminal in common.

However, in the conventional power converting apparatus that uses the voltage of AC input terminal in common or uses the voltage of DC terminal in common, when an overvoltage is applied to the AC input terminal, there is a problem in that the voltage supplied to the fan motor becomes higher more than necessary to heat the fan inverter, and the operating efficiency of the fan inverter is lowered, resulting in lowered reliability for fan motor control.

In order to solve this problem, Korean Patent Publication No. 10-2018-0092085 (published on Aug. 17, 2018) suggests a power converting apparatus that uses a rectifying unit, a boost converter, and a DC terminal capacitor in common in a compressor motor and a fan motor, and adds a buck converter for fan motor control. In this case, since two converters are provided in addition to the rectifying unit, the circuit configuration and operation are complicated, the cost is increased, and there is a limitation in coping with various power supply environments, e.g. a power environment for high voltage applying.

SUMMARY OF THE INVENTION

The present disclosure has been made in view of the above problems, and provides a power converting apparatus that is efficient in various power environments such as high voltage, by controlling the DC voltage after an input power is rectified by using a converter, and an air conditioner having the same.

The present disclosure further provides a power converting apparatus that controls the DC voltage after the input power is rectified by using a converter and can use the same inverter even when the input power is changed so that design and management cost is reduced, and an air conditioner having the same.

The present disclosure further provides a power converting apparatus capable of improving efficiency of an inverter and a motor and reducing heat generation by controlling an output voltage of a converter according to a load, and an air conditioner having the same.

The present disclosure further provides a power converting apparatus capable of reducing heat generation of inverters and improving efficiency even when an overvoltage is applied, and an air conditioner having the same.

The present disclosure further provides a power converting apparatus capable of calculating a maximum torque per ampere (MTPA), and driving a motor based on a current command value corresponding to the calculated maximum torque per ampere, and an air conditioner having the same.

A power converting apparatus according to an embodiment of the present disclosure for achieving the above object, and an air conditioner having the same, control a DC voltage after the input power is rectified by using a converter, thereby improving efficiency and reducing heat generation even in various power environments such as high voltage.

A power converting apparatus according to an embodiment of the present disclosure for achieving the above object, and an air conditioner having the same, may include a rectifying unit configured to rectify an input AC power; a buck converter configured to step down and output the power rectified by the rectifying unit; a first inverter configured to be connected to an output terminal of the buck converter, and convert DC power based on the output of the buck converter into AC power to drive a first motor; a second inverter configured to be connected to the output terminal of the buck converter in parallel with the first inverter, and convert the DC power based on the output of the buck converter into AC power to drive a second motor; and a converter controller configured to control an output voltage of the buck converter.

Meanwhile, the air conditioner according to an embodiment of the present disclosure for achieving the above object may include a first motor and a second motor respectively connected to different loads. Here, the first motor may be a compressor motor, and the second motor may be a fan motor.

Meanwhile, the buck converter may include a switching element configured to have one end connected to the rectifying unit; an inductor configured to be connected to the other end of the switching element; a diode configured to be connected to the other end of the switching element; and a capacitor configured to be connected to the first inverter and the second inverter. Here, the controller may control a duty of the switching element based on a speed of at least one of the first motor and the second motor.

Meanwhile, the air conditioner according to an embodiment of the present disclosure for achieving the above object may further include an input capacitor connected to a node between the rectifying unit and the switching element.

Meanwhile, the converter controller controls the switching element of the buck converter, based on a DC terminal voltage of both ends of the capacitor or a DC terminal voltage command value.

Meanwhile, the converter controller determines minimum and maximum values of the output voltage of the buck converter, based on driving voltages of the first motor and the second motor. Here, the minimum value is a driving voltage of a motor having a low driving voltage among the first and second motors, and the maximum value is a value greater than or equal to a sum of maximum driving voltages of the first motor and the second motor.

Meanwhile, the converter controller determines a range of the output voltage of the buck converter, based on driving voltages of the first motor and the second motor, and controls the output of the buck converter, based on a speed of a motor having a high driving voltage among the first motor and the second motor, within the range of the output voltage of the buck converter. In this case, the converter controller determines minimum and maximum values of the output voltage of the buck converter, based on driving voltages of the first motor and the second motor. Here, the minimum value is a driving voltage of a motor having a low driving voltage among the first and second motors, and the maximum value is a value greater than or equal to a sum of maximum driving voltages of the first motor and the second motor.

A power converting apparatus according to an embodiment of the present disclosure for achieving the above object, and an air conditioner having the same, may further include an inverter controller for controlling switching operations of the switching elements of the first inverter, wherein the inverter controller calculates a maximum torque per ampere (MTPA), based on a driving speed of the first motor, and the converter controller controls the output of the buck converter based on the calculated maximum torque per ampere.

Meanwhile, the inverter controller may include a first current command generation unit configured to generate a current command value, based on calculated or sensed rotor speed information of the first motor, and a speed command value; a first voltage command generation unit configured to generate a voltage command value for driving the first inverter, based on the current command value and the detected current; a first switching control signal output unit configured to output a first switching control signal for driving the first inverter, based on the voltage command value; and a maximum torque calculation unit configured to calculate a maximum torque per ampere (MTPA), based on an output of the current command generation unit, and output the current command value corresponding to the calculated maximum torque per ampere to the first voltage command generation unit and the converter controller.

A power converting apparatus according to an embodiment of the present disclosure for achieving the above object, and an air conditioner having the same, may further include an inverter controller for controlling switching operations of the switching elements of the first and second inverters, wherein the inverter controller calculates a maximum torque per ampere (MTPA), based on a driving speed of the first motor, and wherein the converter controller controls the output of the buck converter, based on the calculated maximum torque per ampere. Here, the inverter controller includes first and second current command generation units configured to generate a current command value, based on calculated or sensed rotor speed information of the first and second motors, and a speed command value; first and second voltage command generation units configured to generate a voltage command value for driving the first and second inverters, based on the current command value and a detected current; first and second switching control signal output units configured to output first and second switching control signals for driving the first and second inverters, based on the voltage command value; and first and second maximum torque calculation units configured to calculate a maximum torque per ampere (MTPA), based on an output of the first and second current command generation units, and output the current command value corresponding to the calculated maximum torque per ampere to the first and second voltage command generation units and the converter controller.

Meanwhile, the first motor may be a compressor motor, and the second motor may be a fan motor.

In addition, the converter controller calculates a maximum torque per ampere based on a driving speed of the first motor, and controls an output of the buck converter based on the calculated maximum torque per ampere.

In addition, a power converting apparatus according to an embodiment of the present disclosure for achieving the above object, and an air conditioner having the same, may further include a maximum torque calculation unit for calculating a maximum torque per ampere based on a driving speed of the first motor, wherein the converter controller controls an output of the buck converter based on the calculated maximum torque per ampere.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
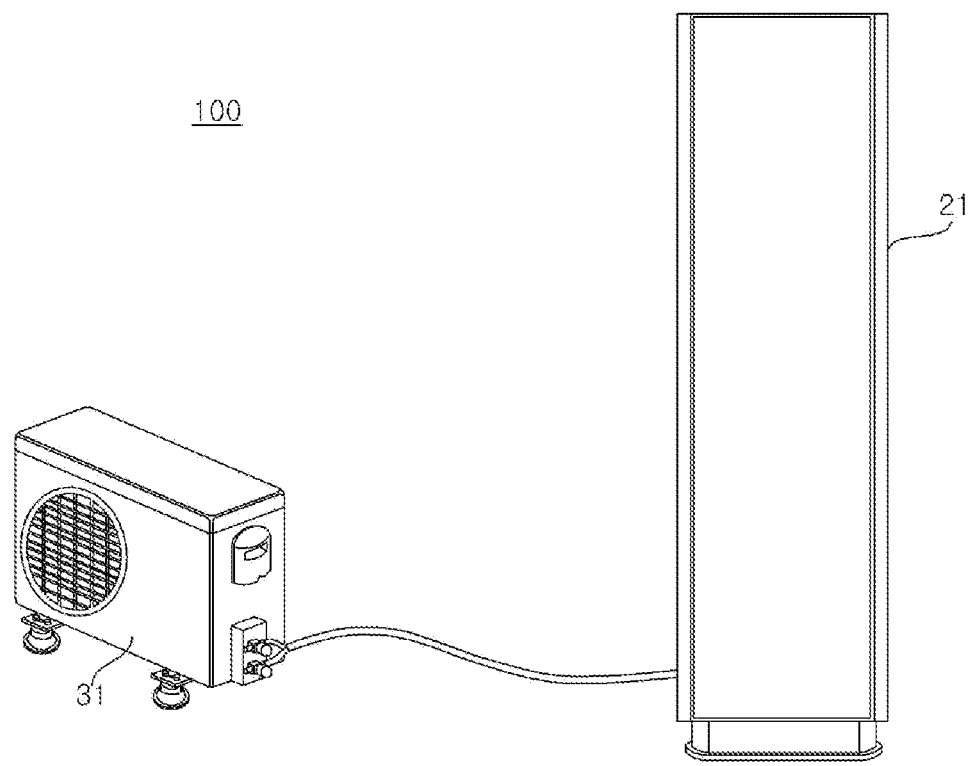
FIG. 1 is a diagram illustrating a configuration of an air conditioner according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components. Terms "module" and "part" for elements used in the following description are given simply in view of the ease of the description, and do not carry any important meaning or role. Therefore, the "module" and the "part" may be used interchangeably. It will be understood that, although the terms "first", "second", etc. may be used herein to describe various elements, these elements should not be limited by these terms. These terms are only used to distinguish one element from another element.

Meanwhile, a power converting apparatus described in the present specification may be a power converting apparatus provided in a home appliance. The home appliance includes a refrigerator, a washing machine, a dryer, an air conditioner, a dehumidifier, a cooking appliance, a vacuum cleaner, and the like. Hereinafter, an air conditioner among various home appliances will be mainly described.

FIG. 1 is a diagram illustrating a configuration of an air conditioner according to an embodiment of the present disclosure.

Referring to FIG. 1, an air conditioner 100 according to the present disclosure may include an indoor unit 21, and an outdoor unit 31 connected to the indoor unit 21.

The indoor unit 21 of the air conditioner is applicable to any of a stand type air conditioner, a wall-mounted type air conditioner, and a ceiling type air conditioner, but in the drawing, a stand type indoor unit 21 is illustrated.

Meanwhile, the air conditioner 100 may further include at least one of a ventilation device, an air cleaning device, a humidifying device, and a heater, and may operate in conjunction with the operation of the indoor unit and the outdoor unit.

The outdoor unit 31 includes a compressor (not shown) that receives and compresses a refrigerant, an outdoor heat exchanger (not shown) that heat exchanges the refrigerant with an outdoor air, an accumulator (not shown) that extracts gaseous refrigerant from the supplied refrigerant and supplies the gaseous refrigerant to the compressor, and a four-way valve (not shown) that selects a flow path of the refrigerant according to the heating operation. In addition, a plurality of sensors, a valve, an oil collector, and the like are further included, but a description of their configuration will be omitted below.

The outdoor unit 31 operates the provided compressor and outdoor heat exchanger and compresses or heat exchanges the refrigerant according to a setting to supply the refrigerant to the indoor unit 21. The outdoor unit 31 may be driven by a remote controller (not shown) or a demand of the indoor unit 21. In this case, as the cooling/heating capacity is varied in correspondence with the driven indoor unit, the number of operation of the outdoor unit and the number of operation of the compressor installed in the outdoor unit may be varied. In addition, although FIG. 1 shows a single indoor unit 21 and a single outdoor unit 31, the present disclosure is not limited thereto. For example, several indoor units 21 may be connected to a single outdoor unit 31 through a refrigerant pipe.

At this time, the outdoor unit 31 supplies the compressed refrigerant to the connected indoor unit 21.

The indoor unit 21 receives a refrigerant from the outdoor unit 31 and discharges cold and hot air into the room. The indoor unit 21 includes an indoor heat exchanger (not shown), an indoor unit fan (not shown), an expansion valve (not shown) through which the supplied refrigerant is expanded, and a plurality of sensors (not shown).

At this time, the outdoor unit 31 and the indoor unit 21 are connected by wire or wireless to transmit and receive data, and the outdoor unit and the indoor unit are connected to a remote controller (not shown) by wire or wirelessly to operate according to the control of the remote controller (not shown).

The remote controller (not shown) may be connected to the indoor unit 21, input a user's control command to the indoor unit, and receive and display state information of the indoor unit. In this case, the remote controller may communicate by wire or wirelessly according to a connection type with the indoor unit.

Figure 2:
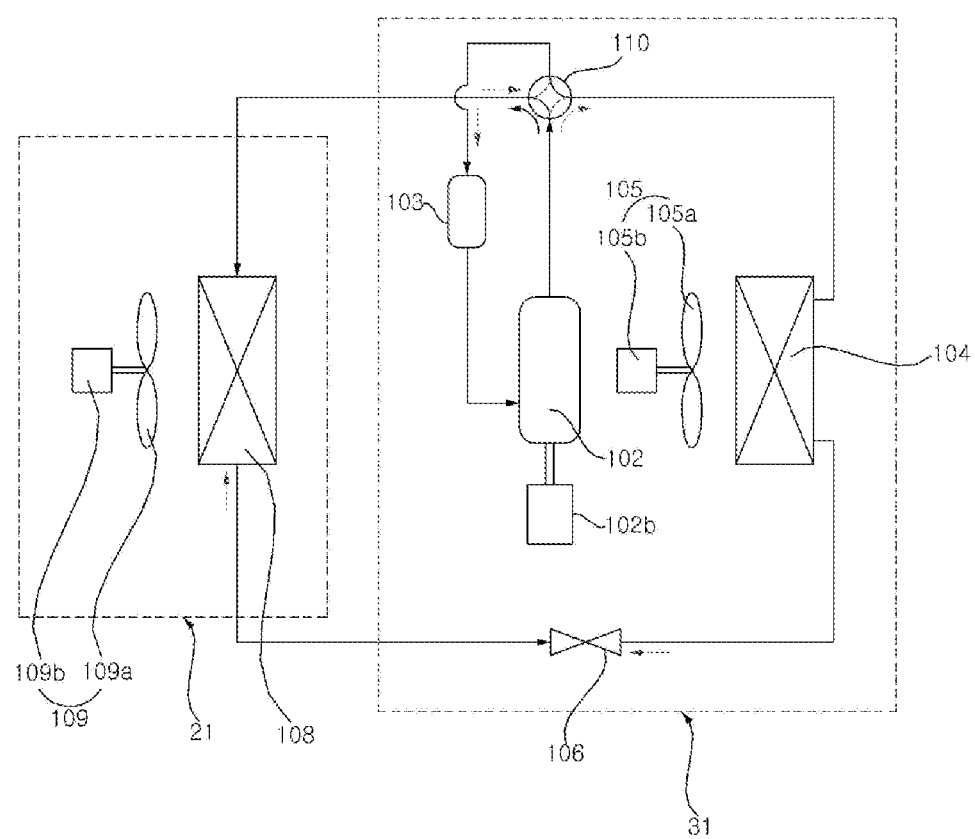
FIG. 2 is a schematic diagram of an outdoor unit and an indoor unit of FIG. 1.

FIG. 2 is a schematic diagram of an outdoor unit and an indoor unit of FIG. 1.

Referring to FIG. 2, the air conditioner 100 is largely divided into an indoor unit 21 and an outdoor unit 31.

The outdoor unit 31 may include a compressor 102 that serves to compress a refrigerant, a compressor motor 102b that drives the compressor, an outdoor heat exchanger 104 that serves to dissipate heat of the compressed refrigerant, an outdoor blower 105 comprising an outdoor fan 105a that is disposed in one side of the outdoor heat exchanger 104 and promotes heat dissipation of refrigerant and a motor 105b that rotates the outdoor fan 105a, an expansion mechanism or expansion valve 106 that expands the condensed refrigerant, a cooling/heating switching valve or four-way valve 110 that changes the flow path of the compressed refrigerant, and an accumulator 103 that temporarily stores the gasified refrigerant to remove moisture and foreign matter, and then supplies a refrigerant of constant pressure to the compressor.

The indoor unit 21 includes an indoor heat exchanger 108 disposed indoors to perform a cooling/heating function, an indoor blower 109 comprising an indoor fan 109a disposed in one side of the indoor heat exchanger 108 to promote heat dissipation of refrigerant and an electric motor 109b rotating the indoor fan 109a, and the like.

At least one indoor heat exchanger 108 may be installed. At least one of an inverter compressor and a constant speed compressor may be used as the compressor 102.

In addition, the air conditioner 100 may be configured of a cooler that cools the room, or may be configured of a heat pump that cools or heats the room.

Meanwhile, the outdoor fan 105a in the outdoor unit 31 may be driven by an outdoor fan driving unit (200 in FIG. 3) that drives the motor 105b.

Meanwhile, the compressor 102 in the outdoor unit 31 may be driven by a compressor motor driving unit (113 in FIG. 3) that drives a compressor motor 102b.

Meanwhile, the indoor fan 109a in the indoor unit 21 may be driven by an indoor fan driving unit (300 in FIG. 3) that drives an indoor fan motor 109b.

The outdoor fan driving unit 200 may be referred to as an outdoor fan driving device. In addition, the indoor fan driving unit 300 may be referred to as an indoor fan driving device.

Figure 3:
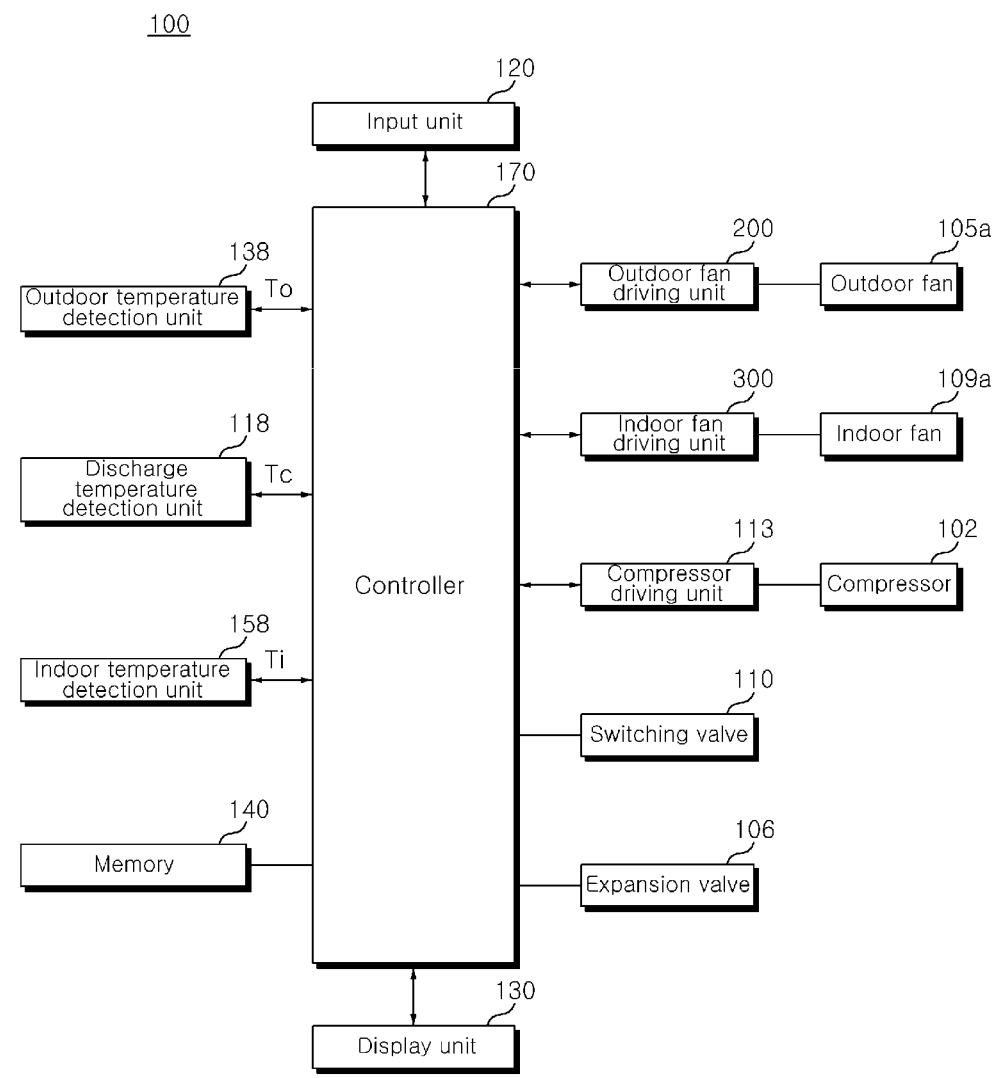
FIG. 3 is a simplified internal block diagram of the air conditioner of FIG. 1.

FIG. 3 is a simplified internal block diagram of the air conditioner of FIG. 1.

Referring to FIG. 3, the air conditioner 100 may include a compressor 102, an outdoor fan 105a, an indoor fan 109a, a controller 170, a discharge temperature detection unit 118, an outdoor temperature detection unit 138, a indoor temperature detection unit 158, and a memory 140. In addition, the air conditioner 100 may further include a compressor driving unit 113, an outdoor fan driving unit 200, an indoor fan driving unit 300, a switching valve 110, an expansion valve 106, a display unit 130, and an input unit 120.

The compressor 102, the outdoor fan 105a, the indoor fan 109a, and the like may operate as described above with reference to FIG. 2.

The input unit 120 includes a plurality of operation buttons, and transmits an input signal for a target operating temperature of the air conditioner to the controller 170.

The display unit 130 may display an operating state of the air conditioner 100. For example, the display unit 130 may include a display means for outputting an operating state of the indoor unit 21 to display an operating state and an error.

The display unit 130 may display a connection state between the indoor unit 21 and the outdoor unit 31. For example, the display unit 130 may include a light emitting diode (LED), and the light emitting diode (LED) may be turned on when the connection state of a communication line and/or a power line is normal, and may be turned off when the connection state of the communication line and/or the power line is abnormal.

The memory 140 may store data necessary for the operation of the air conditioner 100.

The discharge temperature detection unit 118 may detect the refrigerant discharge temperature Tc from the compressor 102, and transmit a signal related to the detected refrigerant discharge temperature Tc to the controller 170.

The outdoor temperature detection unit 138 may detect the outdoor temperature To, which is the temperature around the outdoor unit 31 of the air conditioner 100, and transmit a signal for the detected outdoor temperature To to the controller 170.

The indoor temperature detection unit 158 may detect the indoor temperature Ti, which is the temperature around the indoor unit 21 of the air conditioner 100, and transmits a signal for the detected indoor temperature Ti to the controller 170.

The controller 170 may control the air conditioner 100 to operate, based on at least one of the detected refrigerant discharge temperature Tc, the detected outdoor temperature To, and the detected indoor temperature Ti, and the input target temperature. For example, the controller 170 may control the air conditioner 100 to operate, by calculating a final target superheat degree.

Meanwhile, for controlling the operation of the compressor 102, the indoor fan 109a, and the outdoor fan 105a, as shown in the drawing, the controller 170 may control each of the compressor driving unit 113, the outdoor fan driving unit 200, and the indoor fan driving unit 300.

For example, the controller 170 may output a corresponding speed command value signal to each of the compressor driving unit 113, the outdoor fan driving unit 200, or the indoor fan driving unit 300, based on a target temperature.

In addition, based on each speed command value signal, the compressor motor 102b, the outdoor fan motor 105b, and the indoor fan motor 109b may be operated at a target rotational speed, respectively.

Meanwhile, the controller 170 may control the overall operation of the air conditioner 100, in addition to controlling the compressor driving unit 113, the outdoor fan driving unit 200, or the indoor fan driving unit 300.

For example, the controller 170 may control the operation of the cooling/heating switching valve or the four-way valve 110. Alternatively, the controller 170 may control the operation of the expansion mechanism or the expansion valve 106.

Meanwhile, the air conditioner may further include a power supply unit (not shown) that supplies power to each unit such as the compressor 102, the outdoor fan 105a, the indoor fan 109a, the controller 170, and the memory 140.

The power supply unit may convert and supply input power into power required for driving each unit. Accordingly, at least partial configuration of the power supply unit may be referred to as a power converting apparatus.

In addition, the power converting apparatus may be implemented as a motor driving device that converts power to drive various motors.

In addition, the power converting apparatus may drive a load for performing an operation implemented in the home appliance.

For example, when the home appliance is a clothes dryer, the load may be a blower fan for supplying compressed air.

As another example, when the home appliance is a refrigerator, the load may be a refrigerator compartment fan or a freezing compartment fan.

As another example, when the home appliance is an air conditioner, the load may be an indoor fan, an outdoor fan, or a compressor that compresses a refrigerant.

The power converting apparatus described below may be provided in the driving unit 200, 300, 113 of the home appliance, the power supply unit, and the like.

A variety of power sources ranging from three-phase 220V to three-phase 575V are mainly used for current commercial power for each region/country, and an inverter for driving the compressor and the fan of an commercial air conditioner rectifies 3-phase power into DC power and use the DC power as an input power.

The voltage/current that the switching element, which occupies the largest portion of the inverter components in terms of size/cost, can withstand is limited. In addition, as the voltage/current that the switching element can withstand increases, the size/cost of the switching element further increases.

Therefore, a switching element optimized for the DC voltage level used by the inverter of home appliances such as air conditioner is selected.

Many home appliance manufacturers design the input voltage of the inverter targeting many countries and regions, such as 3-phase 220V, and select and use switching elements according to the design specification. Accordingly, it is difficult to cope with various power environments with the same inverter.

For example, many inverters of the home appliance has a structure that uses the rectified DC voltage intactly in an environment where input power is relatively low or uses the DC voltage after boosting.

In this case, there is a problem in that a switching element having a large allowable voltage/current must be used even in the case of a load having a low driving voltage. In addition, the dual structure, which is boosted for a load having a high driving voltage and then reduced again for a load having a low driving voltage, has a low efficiency, and there is a possibility of circuit burnout when an overvoltage is input to the load having a high driving voltage. For example, since only the input voltage of the inverter for driving a fan motor having a low driving voltage is reduced, when an overvoltage is applied to the AC input terminal, the input voltage of the inverter for driving the compressor having a high driving voltage cannot be reduced.

In addition, when the boost structure is basically used, it is more difficult to cope with a high voltage environment having a high input voltage such as three-phase 575V without changing the inverter design.

Accordingly, embodiments of the present disclosure propose a technology for driving a load such as a compressor, a fan, or the like without changing the inverter design even if the input power is changed by controlling the DC voltage after the input power is rectified by using a converter.

Figure 4:
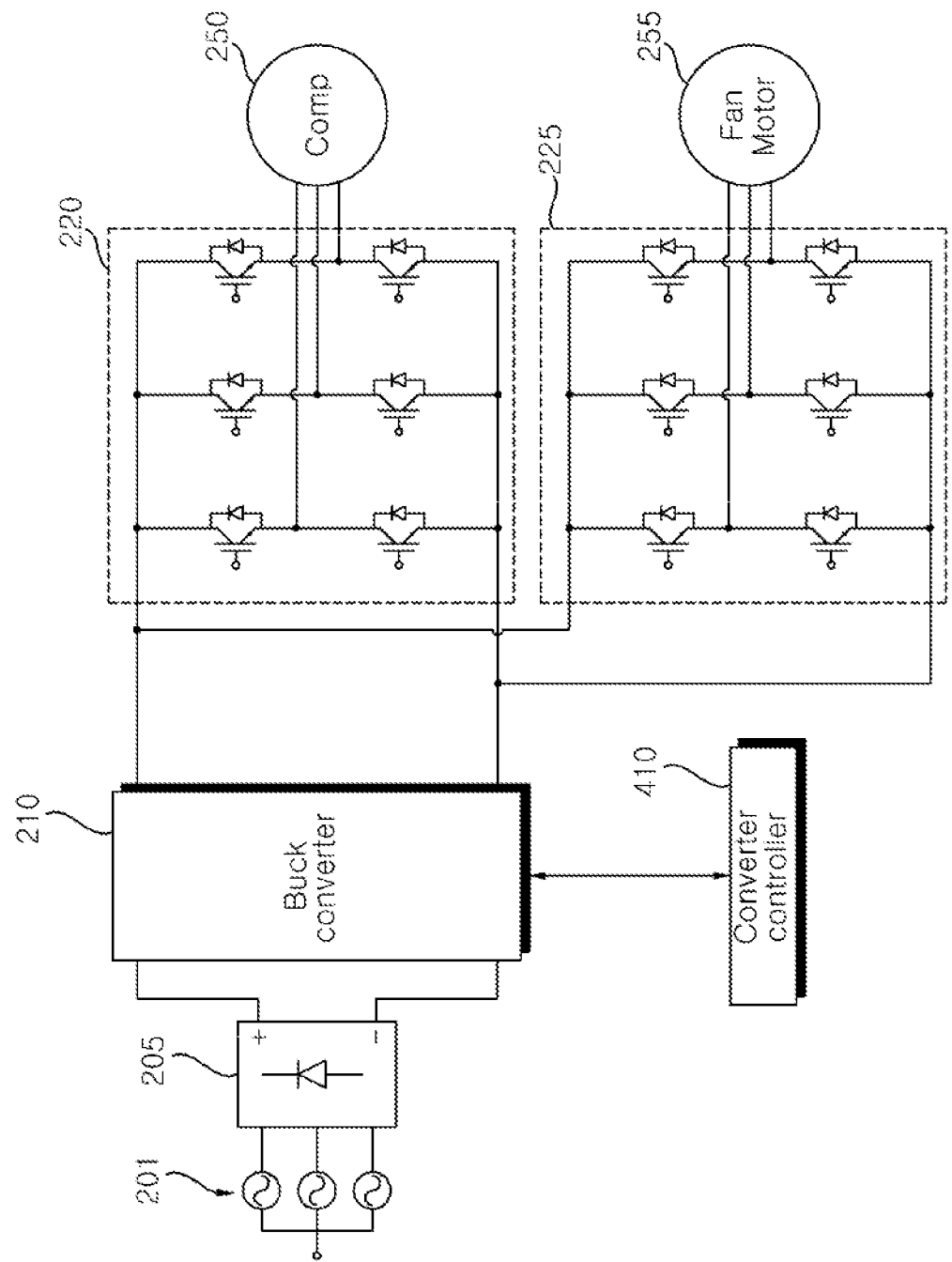
FIG. 4 is a circuit diagram of a power converting apparatus according to an embodiment of the present disclosure.

FIG. 4 is a circuit diagram of a power converting apparatus according to an embodiment of the present disclosure.

Referring to FIG. 4, a power converting apparatus according to an embodiment of the present disclosure may include a rectifying unit 205 that rectifies an input AC power 201, a buck converter 210 that steps down and outputs the power rectified by the rectifying unit 205, and a converter controller 410 that controls the buck converter 210.

The buck converter 210 is a step-down converter for stepping-down and outputting an input power, and an output voltage may be varied under control of the converter controller 410.

Meanwhile, the power converting apparatus according to an embodiment of the present disclosure may include inverters 220 and 225 that are connected in parallel to the output terminal of the buck converter 210 and drive each of the loads 250 and 255.

Referring to FIG. 4, the first inverter 220 and the second inverter 225 may be connected in parallel to the output terminal of the buck converter 210, and convert DC power based on the output of the buck converter 210 into AC power to drive a first motor 250 and a second motor 255, respectively.

Referring to the example of FIG. 4, when the home appliance is an air conditioner, the first motor 250 may be a compressor motor 250 and the second motor 255 may be a fan motor 255.

According to an embodiment of the present disclosure, it is possible to cope with various power environments, particularly, a high voltage environment, by using the buck converter 210 to step down the input power and controlling the output voltage of the buck converter 210 in the converter controller 410. Accordingly, it is possible to cope with a high voltage environment that is used only for a small number of countries and regions without a separate inverter design, so that design, manufacturing, and management costs can be reduced.

Figure 5A:
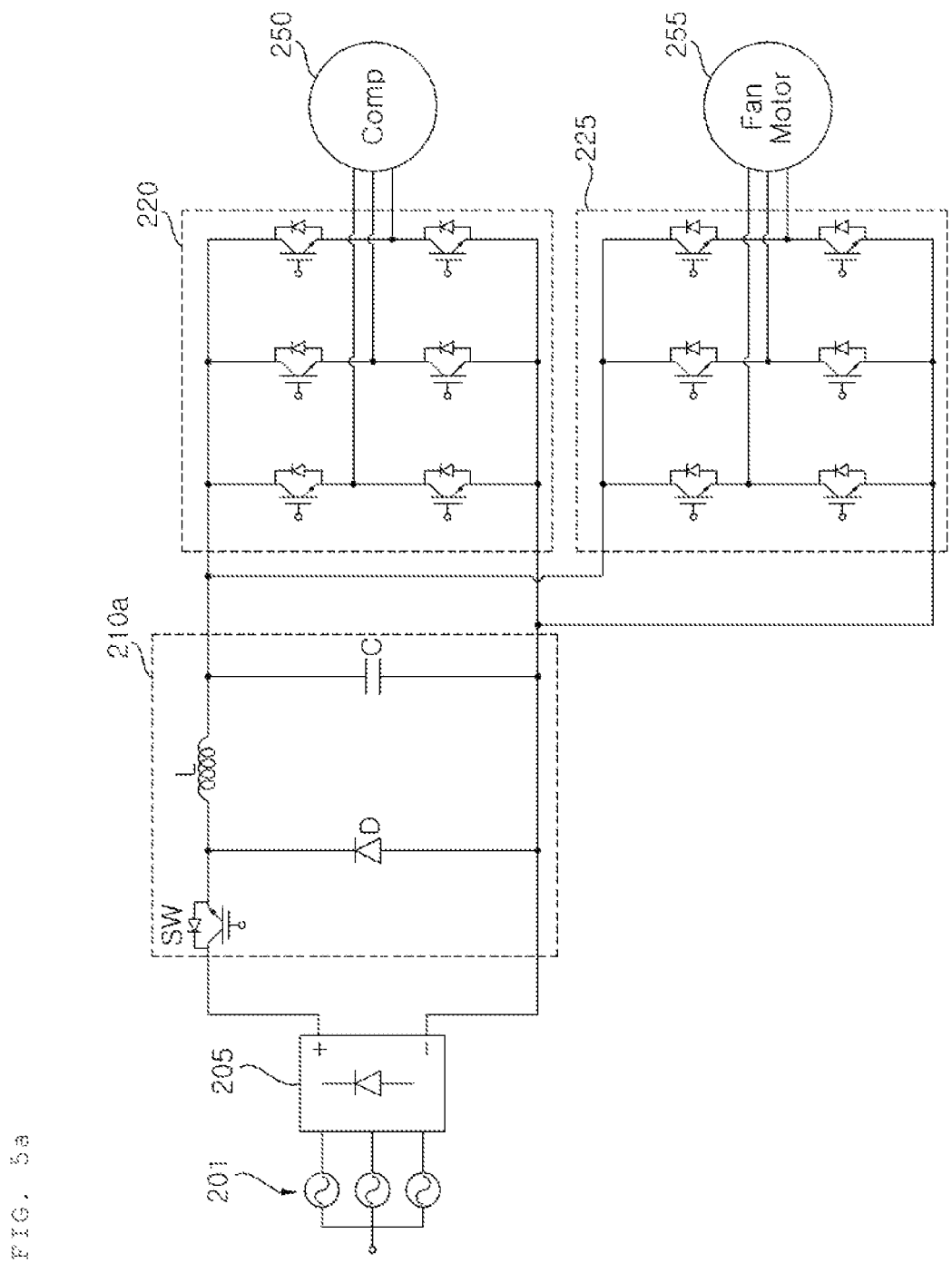
FIGS. 5A and 5B are circuit diagrams of a converter according to an embodiment of the present disclosure.
Figure 5B:
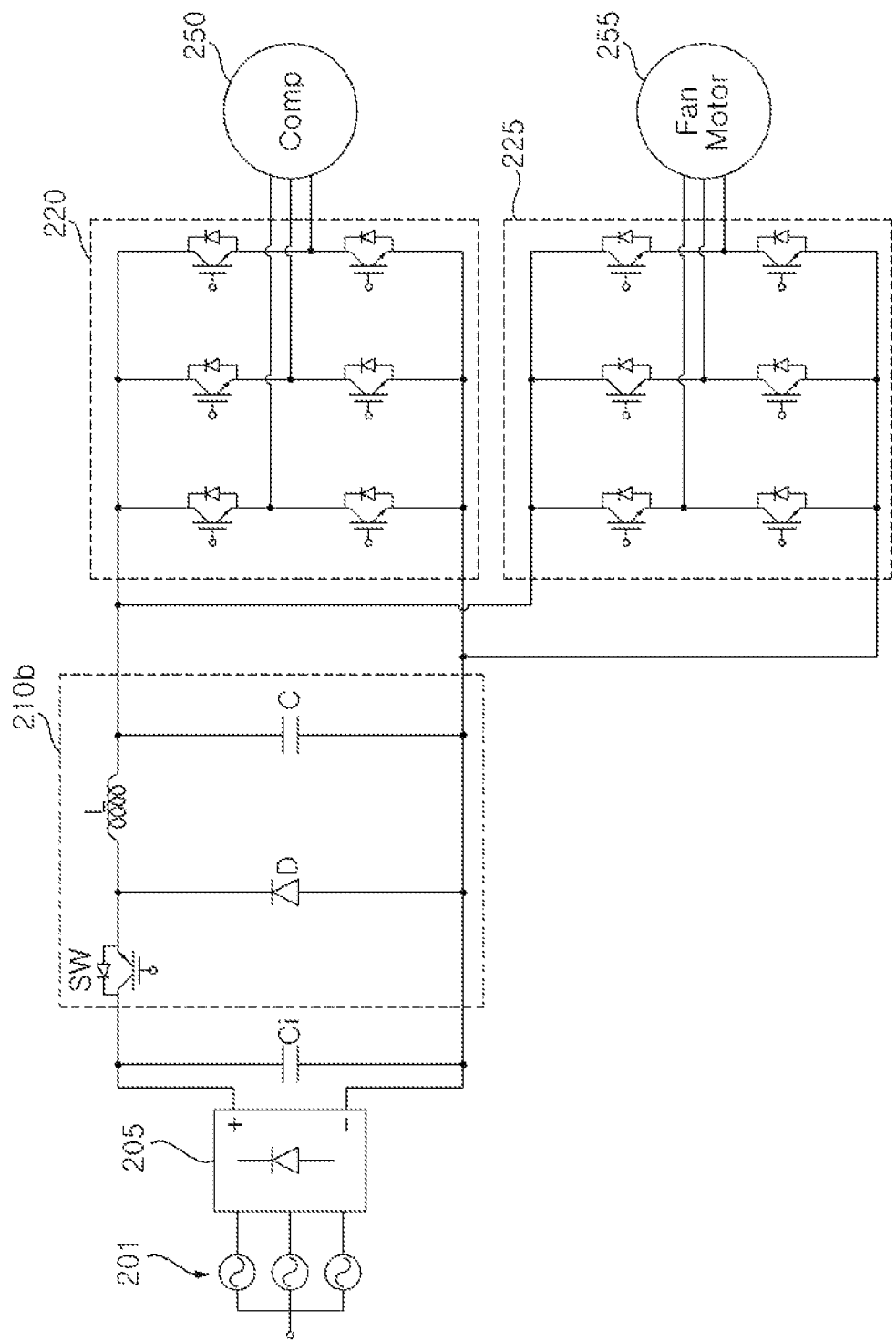

FIGS. 5A and 5B are circuit diagrams of a converter according to an embodiment of the present disclosure, and illustrate specific circuits of the buck converter 210.

Referring to FIGS. 4 and 5A, the buck converter 210a according to an embodiment of the present disclosure may include a switching element SW having one end connected to the rectifying unit 205, an inductor L connected to the other end of the switching element SW, a diode D connected to the other end of the switching element SW, and a capacitor C connected to the first and second inverters 220 and 225.

The switching element SW may be an IGBT, a MOSFET device, or the like, and is switched according to a control signal from the converter controller 410. The converter controller 410 may generate a PWM control signal for turning on/off the switching element SW and supply the PWM control signal to the switching element SW.

Meanwhile, the switching element SW may provide a reflux current path for the inductor L. Meanwhile, when the switching element SW is turned on to flow a current, the current flowing from the switching element SW to the inductor L increases, and energy may be charged in the inductor L. In addition, energy is consumed when the switching element SW is turned off.

Accordingly, as the turn-on section of the switching element SW becomes longer, the output voltage of the buck converter 210 is increased, and as the turn-off section becomes longer, the output voltage of the buck converter 210 is decreased. Accordingly, the converter controller 410 may control the duty of the switching element SW to control the output voltage of the buck converter 210.

Referring to FIGS. 4 and 5B, the power converting apparatus according to an embodiment of the present disclosure may further include an input capacitor Ci connected to a node between the rectifying unit 205 and the switching element SW. That is, in FIG. 5B, the input capacitor Ci is added to the front end of the buck converter 210a of FIG. 5A.

Meanwhile, the input capacitor Ci connected to the output terminal of the rectifying unit 205 may smooth the input power in the input side of the buck converter 210 and 210b. Accordingly, the power factor can be improved.

The inverter 220 and 225 may convert the DC voltage at both ends of the capacitor C into an AC voltage to drive the loads 250 and 255.

Meanwhile, in order to stabilize the input voltage of the inverter 220 and 225 side, a capacitor C having a high capacity is required. However, as the capacity of the capacitor C increases, the manufacturing cost and volume increase, so a converter capable of stabilizing the output voltage while reducing the capacity of the capacitor C is required. In particular, it is necessary to reduce the capacity of the capacitor C even in a high voltage environment, so that the inverter design may not be changed.

According to an embodiment of the present disclosure, the buck converter 210 is used to step down the input power, and the converter controller 430 stably controls the output voltage of the buck converter 210, so that a device having a small capacity may be used as the capacitor C and a switching element in the inverter 220 and 225.

The buck converter 210 may include a switching element SW that switches according to a duty value of a control signal input from the converter controller 410, and may reduce the voltage input according to the switching operation of the switching element SW.

That is, the converter controller 410 may output a converter switching control signal to the buck converter 210 in order to control the switching operation in the buck converter 210.

According to an embodiment, the converter controller 410 may control the switching element SW of the buck converter 210, based on the DC terminal voltage or the DC terminal voltage command value of both ends of the capacitor C.

If the inverter 220, 225 and the motor 250, 255 are named as a load, it can be seen that the load is connected to both ends of the capacitor C of the power converting apparatus. Accordingly, the DC terminal voltage Vdc may correspond to the load voltage. The output voltage Vdc detected in the DC terminal is a discrete signal in the form of a pulse, and may be input to the converter controller 410.

For example, the converter controller 410 may control to switch the switching element SW to increase or decrease the output voltage, based on the DC terminal voltage Vdc or the DC terminal voltage command value. The switching at this time may be a pulse width modulation PWM based switching.

Meanwhile, when the input voltage of the inverter 220, 225 is increased, the surge peak voltage is increased to increase switching loss, and the duty is decreased to shorten the current sensible time, thereby deteriorating control reliability.

When the buck converter 210 is used, such a phenomenon can be reduced, and a margin of the inverter withstand voltage can be secured, thereby further increasing reliability.

When the voltage input from the DC terminal capacitor c is higher than the optimum voltage for driving the fan motor 255, the switching loss in the inverter 225 for driving the fan motor 255 increases, and heat generation increases, thereby deteriorating the drive control reliability.

Accordingly, when the DC terminal voltage is high, the buck converter 210 may step down to a voltage suitable for driving the fan motor 255.

In addition, when the DC terminal voltage is high, the switching duty of the inverter 225 for driving the fan motor 255 is shortened. Thus, the time for sensing the phase current of the fan motor 255 through the shunt resistor may be shortened, which may affect the control reliability. However, the control reliability can be improved by controlling the output voltage of the buck converter 210.

According to an embodiment, the converter controller 410 may control the duty of the switching element SW, based on at least one speed of the first motor 250 and the second motor 255. That is, the converter controller 410 may control the duty of the switching element SW according to a load, and change the output voltage of the buck converter 210.

In more detail, the converter controller 410 may determine a minimum value and a maximum value of the output voltage of the buck converter 210, based on the driving voltage of the first motor 250 and the second motor 255. In this case, the minimum value may be a driving voltage of a motor having a low driving voltage among the first motor 250 and the second motor 255, and the maximum value may be greater than or equal to the sum of the maximum driving voltage of the first motor 250 and the second motor 255. When the first motor 250 is a compressor motor and the second motor 255 is a fan motor, the minimum value of the output voltage of the buck converter 210 may be determined based on the driving voltage of the fan motor. In addition, since the maximum value of the output voltage of the buck converter 210 is determined to be greater than the sum of the driving voltages of the fan motor and the compressor motor, a sufficient voltage for simultaneously driving the fan motor and the compressor motor may be secured.

According to an embodiment, the converter controller 410 may determine a range of the output voltage of the buck converter 210, based on driving voltages of the first motor 250 and the second motor 255. In addition, the converter controller 410 may control the output of the buck converter 210, based on the speed of a motor having a high driving voltage among the first motor 250 and the second motor 255, within the range of the output voltage of the buck converter 210. When the first motor 250 is a compressor motor and the second motor 255 is a fan motor, the converter controller 410 may control the output of the buck converter 210, based on the speed of the compressor motor having a high driving voltage.

Even in this case, the converter controller 410 may determine the minimum and maximum values of the output voltage of the buck converter 210, based on the driving voltages of the first motor 250 and the second motor 255. In this case, the minimum value is a driving voltage of a motor having a low driving voltage among the first motor 250 and the second motor 255, and the maximum value may be greater than or equal to the sum of the maximum driving voltage of the first motor 250 and the second motor 255.

Figure 6:
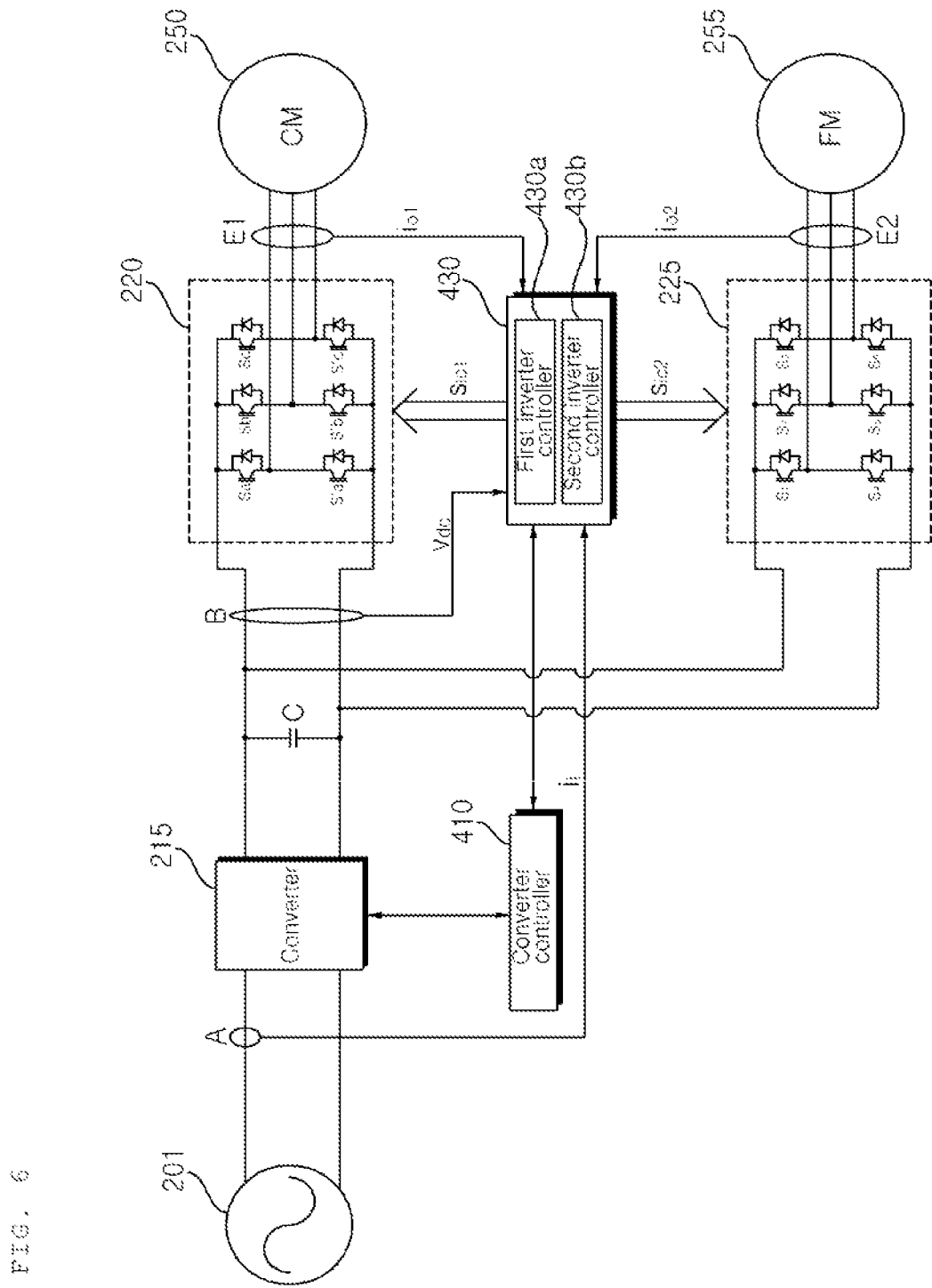
FIG. 6 is a circuit diagram of a power converting apparatus according to an embodiment of the present disclosure.

FIG. 6 is a circuit diagram of a power converting apparatus according to an embodiment of the present disclosure.

Referring to FIG. 6, the power converting apparatus according to an embodiment of the present disclosure may further include an inverter controller 430 that controls switching operations of switching elements of the first and second inverters 220 and 225.

The converter 215 may include a diode element, and output power rectified by the diode element as a DC power.

Meanwhile, the converter 215 may include a diode element and a switching element, and may output DC power converted according to a switching operation of the switching element and a rectification characteristic of the diode element.

Meanwhile, the commercial AC power may be a single-phase AC power or a three-phase AC power. In the case of single-phase AC power, the converter 215 may include four diode elements, or may include four diode elements and two switching elements. In the case of a three-phase AC power, the converter 215 may include six diode elements or six switching elements.

In addition, the converter 215 may include a step-down converter. That is, the converter 215 may include the rectifying unit 205 and the buck converter 210 of FIG. 4.

In addition, the converter controller 410 may control the converter 215.

A smoothing capacitor C is connected to the output terminal of the converter 215. The rectified power output from the converter 215 is smoothed as DC power. Hereinafter, the output terminal of the converter 215 is referred to as a DC terminal or a dc link terminal. The DC voltage smoothed in the DC terminal is applied to the compressor inverter 220 and the fan inverter 225. The compressor inverter 220 includes a plurality of switching elements, converts the DC power smoothed by the on/off operation of the switching element into a three-phase AC power having a certain frequency, and outputs to the compressor motor 250.

The compressor inverter 220 includes a pair of upper arm switching elements (Sa, Sb, Sc) and lower arm switching elements (S'a, S'b, S'c) that are connected in series with each other, and a total of three pairs of upper and lower arm switching elements are connected in parallel (Sa&S'a, Sb&S'b, Sc&S'c) to each other. Diodes are connected in reverse parallel to each of the switching elements (Sa, S'a, Sb, S'b, Sc, and S'c).

The switching elements (Sa, S'a, Sb, S'b, Sc, S'c) in the compressor inverter 220 are turned on/off respectively, based on a first switching control signal Sic1 from the inverter controller 430. For example, in particular, in the turn-on/off operation of the switching element, a pulse width modulation (PWM) switching is performed due to a space vector, so that a three-phase AC power having a certain frequency may be output to the three-phase motor 250.

The three-phase AC power output from the compressor inverter 220 is applied to each phase of the three-phase electric motor 250. Here, the three-phase motor 250 includes a stator and a rotor, and each phase AC power having a certain frequency is applied to the coil of the stator of each phase, so that the rotor rotates. Various types of the three-phase motor 250, such as a BLDC motor, a synRM motor, and an induction motor, can be implemented.

The fan inverter 225 includes a plurality of switching elements, similarly to the compressor inverter 220, and converts the DC power smoothed by the turn-on/off operation of the switching element into a three-phase AC power having a certain frequency, and output to the fan motor 255.

The fan inverter 225 includes a pair of upper-arm switching elements (S1, S2, S3) and lower-arm switching elements (S4, S5, S6) that are connected in series with each other, and a total of three pairs of upper and lower arm switching elements are connected in parallel to each other (S1&S4, S2&S5,S3&S6). Diodes are connected in reverse parallel to each of the switching elements (S1&S4, S2&S5, S3&S6).

The switching elements (S1 to S6) in the fan inverter 225 perform an turn-on/off operation of each of the switching elements (S1 to S6), based on a second switching control signal Sic2 from the inverter controller 430.

Meanwhile, in order to control the switching operation of the compressor inverter 220 and the fan inverter 225, the inverter controller 430 outputs the first switching control signal Sic1 and the second switching control signal Sic2 to the compressor inverter 220 and the fan inverter 225, respectively.

The first switching control signal Sic1 and the second switching control signal Sic2 are a switching control signal for PWM, generated based on respectively detected output current (io1, io2), and output to the compressor inverter 220 and the fan inverter 225, respectively. To this end, an output current detection unit (E1, E2) may be provided.

A first output current detection unit E1 detects the output current io1 flowing through the compressor motor 250. The first output current detection unit E1 may detect all of the output current of each phase, or may detect output current of a single phase or two phases by using three-phase balance.

The first output current detection unit E1 may be disposed between the compressor inverter 220 and the compressor motor 250, as shown in the drawing. For example, the first output current detection unit E1 may include any one of a current sensor, a current transformer, and a shunt resistor. As another example, a shunt resistor connected to one end of each of the three lower arm switching elements (S'a, S'b, S'c) in the compressor inverter 220 may be provided.

The detected first output current io1, as a discrete signal in the form of a pulse, may be applied to the inverter controller 430, and may be used to estimate the input current, based on the detected first output current io1. Further, the detected first output current io1 may be used to generate the first switching control signal Sic1.

The second output current detection unit E2 detects the output current io2 flowing through the fan motor 255, similarly to the first output current detection unit E1.

The second output current detection unit E2 may be disposed between the fan inverter 225 and the fan motor 255, as shown in the drawing. For example, the second output current detection unit E2 may include any one of a current sensor, a current transformer, and a shunt resistor. As another example, a shunt resistor connected to one end of each of the three lower arm switching elements (S'a, S'b, S'c) in the fan inverter 225 may be provided.

Based on the detected second output current io2, it may be used to estimate the input current. Further, the detected second output current io2 may be used to generate the second switching control signal Sic2.

Meanwhile, in order to detect an abnormal operation of the converter 215 terminal, the power converting apparatus of the air conditioner according to an embodiment of the present disclosure may include an input current detection unit A for detecting the input current Ii from the commercial AC power, and a DC terminal voltage detection unit B.

The input current detection unit A may be positioned between the commercial AC power 201 and the converter 215, as shown in the drawing. For current detection, a current sensor, a current transformer CT, a shunt resistor, or the like may be used.

The input current detection unit A may instantly detect the input current Ii, and the detected input current Ii may be applied to the inverter controller 430.

Meanwhile, the inverter controller 430 may compare the detected input current Ii with a preset reference value, and restrict the operation of the compressor inverter 220 and the fan inverter 225 when the detected input current Ii is determined to be an overcurrent or a low current. For example, the inverter controller 430 may not output a first switching control signal Sic1 and a second switching control signal Sic2 to the compressor inverter 220 and the fan inverter 225, or may output the first switching control signal Sic1 and the second switching control signal Sic2 for turning off all switching elements. Furthermore, it may control to stop the supply of commercial AC power.

Meanwhile, a DC terminal voltage detection unit B may include a resistance element positioned between both ends of the DC terminal.

The DC terminal voltage detection unit B may detect the DC terminal voltage Vdc on average or instantaneously, and the detected DC terminal voltage Vdc may be applied to the inverter controller 430. In addition, the detected DC terminal voltage Vdc may be applied to the converter controller 410.

Meanwhile, the inverter controller 430 may compare the detected DC terminal voltage Vdc with a preset reference value, and may restrict the operation of the compressor inverter 220 and the fan inverter 225 when the detected DC terminal voltage Vdc is determined to be overvoltage or low voltage. For example, the inverter controller 430 may not output the first switching control signal Sic1 and the second switching control signal Sic2 to the compressor inverter 220 and the fan inverter 225, or may output the first switching control signal Sic1 and the second switching control signal Sic2 for turning off all switching elements. Furthermore, it is also possible to control to stop the supply of commercial AC power.

As described above, the input current detection unit A and the DC terminal voltage detection unit B are used to restrict the operation of the compressor inverter 220 and the fan inverter 225 in abnormality, so that the stability of the circuit element can be secured.

The inverter controller 430 according to an embodiment of the present disclosure may include a first inverter controller 430a for controlling the first inverter 220 and a second inverter controller 430b for controlling the second inverter 225.

Figure 7:
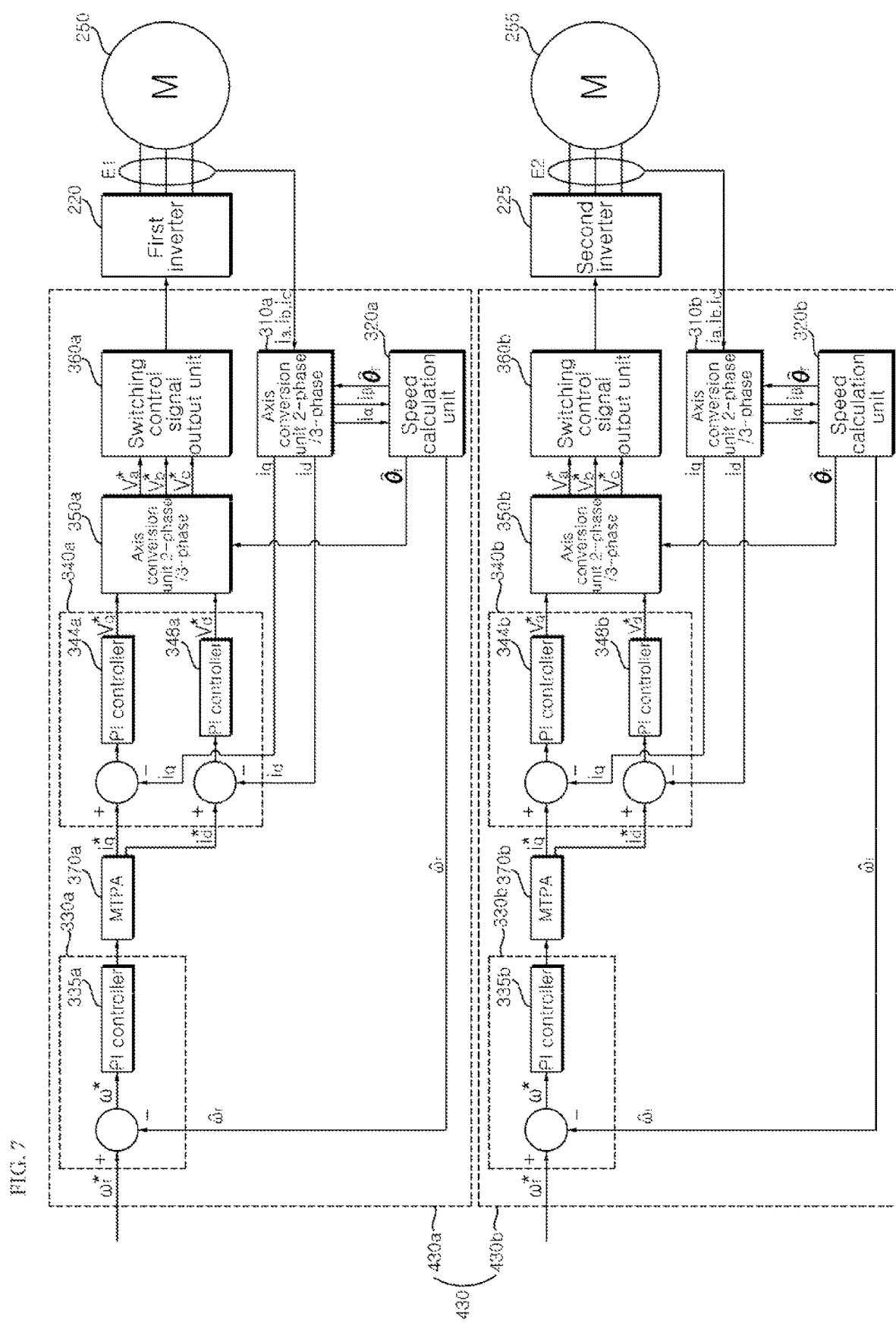
FIG. 7 is an internal block diagram of an inverter controller according to an embodiment of the present disclosure.

FIG. 7 is an internal block diagram of an inverter controller according to an embodiment of the present disclosure.

Referring to FIG. 7, the inverter controller 430 may include an axis conversion unit 310a and 310b, first and second current command generation units 330a and 330b, first and second voltage command generation units 340a and 340b, an axis conversion units 350a and 350b, and first and second switching control signal output units 360a and 360b.

The axis conversion unit 310a and 310b converts the output current (ia, ib, ic or ix, iy, iz) detected by the output current detection unit E into a two-phase current (i∝, iβ) of the stationary coordinate system.

Meanwhile, the axis conversion unit 310a and 310b may convert a two-phase current (i∝, iβ) of the stationary coordinate system into a two-phase current (id, iq) of the rotational coordinate system.

According to an embodiment, the inverter controller 430 further includes a speed calculation unit (not shown), and the speed calculation unit may estimate the position value $\hat{\theta}_r$, based on the output current (ia, ib, ic) detected by the output current detection unit E, and calculate the speed $\hat{\omega}_r$ by differentiating the estimated position.

The speed calculation unit may calculate the rotor speed of the motor (250, 255), based on the output current (ia, ib, ic) detected by the output current detection unit E.

Meanwhile, the first and second current command generation units 330a and 330b may generate a current command value based on an operation command value. The operation command value at this time may be, for example, a torque command value or a speed command value. Hereinafter, an example of generating a current command value based on the speed command value ω*r will be mainly described. The first and second current command generation units 330a and 330b may generate a current command value, based on the calculated or sensed rotor speed information of the motor 250, 255 and the speed command value ω*r.

The first and second current command generation units 330a and 330b generate a current command value i*q, based on an operation speed $\hat{\omega}_r$ and a speed command value ω*r. For example, the first and second current command generation units 330a and 330b perform PI control in the PI controller (335a, 335b), based on the difference between the calculation speed ($\hat{\omega}_r$ and the speed command value ω*r, and may generate a current command value i*q. In the drawing, it is illustrated that the current command value is a q-axis current command value i*q, but unlike the drawing, it is also possible to generate the d-axis current command value i*d together. Meanwhile, the value of the d-axis current command value i*d may be set to 0.

The first and second voltage command generation units 340a and 340b may generate a voltage command value for driving the first and second inverters 220 and 225, based on the current command value i*q and the detected current.

Meanwhile, the first and second current command generation units 330a and 330b may further include a limiter (not shown) that limits a level of the current command value i*q so as not to exceed the allowable range.

Next, the first and second voltage command generation units 340a and 340b may generate d-axis and q-axis voltage command values (v*d,v*q), based on the d-axis and q-axis currents (id, iq) that are axially converted into a two-phase rotational coordinate system by the axis conversion unit 310a, 310b, and the current command value (i*d, i*q) in the first and second current command generation units 330a, 330b, etc.,.

For example, the voltage command generation unit 340a, 340b may perform a PI control by the PI controller 344a, 344b, and generate a q-axis voltage command value v*q, based on the difference between the q-axis current iq and the q-axis current command value i*q. Further, the voltage command generation unit 340a, 340b may perform a PI control by the PI controller 344a, 344b, and generate a d-axis voltage command value v*d, based on the difference between the d-axis current id and the d-axis current command value i*d. Meanwhile, the voltage command generation unit 340a, 340b further include a limiter (not shown) that limits the level of the d-axis and q-axis voltage command values (v*d, v*q) so as not to exceed the allowable range.

Meanwhile, the generated d-axis and q-axis voltage command values (v*d, v*q) are input to the axis conversion unit 350a, 350b.

The axis conversion unit 350a, 350b may receive the position ($\hat{\theta}_r$) calculated by a speed calculation unit 320 and the d-axis and q-axis voltage command values (v*d, v*q), and perform axis conversion.

First, the axis conversion unit 350a, 350b performs conversion from a two-phase rotation coordinate system into a two-phase stationary coordinate system. In this case, a value based on the position $\hat{\theta}_r$ calculated by the speed calculation unit 320 may be used.

In addition, the axis conversion unit 350a, 350b performs conversion from a two-phase stationary coordinate system to a three-phase stationary coordinate system. Through this conversion, the axis conversion unit 350a, 350b outputs a three-phase output voltage command value (v*a, v*b, v*c, v*x, v*y, v*z).

The switching control signal output unit 360a, 360b generates and outputs an inverter switching control signal Sic according to the pulse width modulation (PWM) method, based on the three-phase output voltage command value (v*a, v*b, v*c, v*x, v*y, v*z).

The output inverter switching control signal Sic may be converted into a gate driving signal by a gate driver (not shown), and may be input to the gate of each switching element in the first and second inverters 220 and 225. Accordingly, each of the switching elements (Sa, S'a, Sb, S'b, Sc, S'c) in the first and second inverters 220 and 225 performs a switching operation.

Meanwhile, the power converting apparatus may detect the output current, in particular, the phase current, flowing through the motor 250, 255 so as to perform vector control that drives the motor 250, 255, through the control of the inverter 420.

The inverter controller 430 may control the motor 250, 255 with desired speed and torque, by using the detected phase current, through the first and second current command generation units 330a and 330b and the first and second voltage command generation units 340a and 340b.

Meanwhile, in the example of FIG. 7, the position $\hat{\theta}_r$ and speed $\hat{\omega}_r$ are calculated and used in a sensorless manner, but it is also possible to detect the rotor position and speed of the motor 250 and 255 by using a sensor such as a hall sensor and an encoder.

In this case, a motor drive device may further include a position detection sensor, such as hall sensor, encoder, and resolver, for sensing the rotor position and speed of the motor 250, 255.

The inverter controller 430 according to an embodiment of the present disclosure may further include a maximum torque calculation unit 370a, 370b that calculates a maximum torque per ampere (MTPA), based on the outputs of the first and second current command generation units 330a and 330b, and outputs the current command value corresponding to the calculated maximum torque per ampere to the first and second voltage command generation units 340a and 340b.

A torque calculation unit (not shown) may be provided inside or outside the first and second current command generation units 330a and 330b. The torque calculation unit may calculate the current torque T, based on the calculated or sensed speed ω.

Next, the first and second current command generation units 330a and 330b generate the current command value (i*d, i*q), based on the calculated current torque T and the torque command value T* received from the inverter controller 430.

For example, the first and second current command generation units 330a and 330b may perform a PI control by the PI controller 335a, 335b, based on the calculated current torque T and the torque command value T* received from the controller 170, and generate a current command value (i*d, i*q). Meanwhile, the value of the d-axis current command value i*d may be set to 0.

The output values of the first and second current command generation units 330a and 330b are divided into ½ and enter respectively into the maximum torque calculation unit 370a, 370b for maximum torque control for the first and second inverters 220 and 225. The maximum torque calculation unit 370a, 370b may calculate respective d-q-axis current reference values and output a current command value for maximum torque control to the first and second voltage command generation units 340a and 340b. In addition, the maximum torque calculation unit 370a, 370b may output a current command value for maximum torque control to the converter controller 410.

The maximum torque calculation unit 370a, 370b may output a current command value corresponding to the calculated maximum torque or the calculated maximum efficiency. Since the motor is driven by the current command value based on this, the motor driving stability is improved.

The voltage equation of the permanent magnet embedded synchronous motor (IPMSM) is as follows.

$$V_d = R_a + pL_d)i_d - \omega L_q i_q$$

$$Vq = \omega L_d i_d + (R_a + pL_q)i_q + \omega \phi_f$$

Vd, Vq: d, q axis voltage
id, iq: d, q axis current
Ld, Lq: d, q axis inductance
Ra: phase resistance
ω: rotor electric angular velocity
Φ: flux linkage
p: Differential operator In the above motor voltage equation, assuming that the phase resistance is small enough, and it is in a normal state (the state where there is no current fluctuation), the differential component of the current is negligible. Accordingly, the voltage equation and the magnitude of the voltage vector may be expressed as follows.

$$V_d' = \omega L_q i_q / V_q' = \omega L_d i_d + \omega \phi_f$$

$$V_m = \sqrt{V_d'^2 + V_q'^2} = \omega \sqrt{(L_q i_q)^2 + (\phi_f + L_d i_d)^2}$$

From the above equation, a necessary maximum voltage vector can be obtained by using a maximum current when the driving speed is constant, and when the current is constant, the magnitude of the voltage vector is changed in proportion to the operating speed. Therefore, a necessary minimum DC voltage is calculated from the voltage vector magnitude when applying the maximum current and the minimum DC voltage is varied in proportion to the operating speed, so that even if the speed is increased, the motor can be driven without increasing the copper loss due to entering the weak field section.

In the same load condition/same current angle (same dq current), the switching loss of the inverter and the core loss of the motor generally increase as the DC voltage increases. Therefore, it is controlled by a necessary minimum DC voltage in proportion to the operating speed, thereby increasing the efficiency of the inverter and the motor while performing MTPA operation.

In addition, by placing a step-down converter in the input terminal of the inverter, an inverter/motor having a low withstand voltage can be used even in an environment where high input power is used, so that components can be used in common.

In some embodiments, the maximum torque calculation unit 370a, 370b may be separately provided outside the inverter controller 430. Alternatively, the maximum torque calculation unit 370a, 370b may be provided in the converter controller 410.

Meanwhile, in the example of FIG. 7, the second inverter controller 430b is configured in the same manner as the first inverter controller 430a, but in some embodiments, the second inverter controller 430b may be configured to be partially different from the first inverter controller 430a. For example, the second inverter controller 430b may not include the maximum torque calculation unit 370b.

Meanwhile, the first and second switching control signal output units 360a and 360b may control switching operations of the switching elements of the first and second inverters 220 and 225, by a space vector-based pulse width modulation control.

The first and second switching control signal output units 360a and 360b may control switching operations based on the current detected by the output current detection unit E.

According to embodiments of the present disclosure, the DC voltage after the input power is rectified is controlled by using the buck converter 210, so that even when the input power is changed, the compressor 250 and the fan motor 255 can be driven by using the same inverter 220, 225 without a design change. That is, when a product is released in a region having a different power environment, the input voltage of the inverter 220, 225 is controlled according to the previously developed inverter 220, 225 by using the converter 210, thereby reducing the effort of developing the inverter 220, 225 and the motor 250, 255 separately depending on the power, and improving productivity by reducing the type of managed components.

In addition, according to embodiments of the present disclosure, it is possible to increase the efficiency of the inverter 220, 225 and the motor 250, 255 and reduce heat generation by varying the input voltage of the inverter according to the load, and vibration/noise of the compressor 250 and the fan motor 255 can be reduced by improving the quality of the input DC power of the inverter.

In addition, according to embodiments of the present disclosure, when an overvoltage is applied to the AC input terminal, it is possible to reduce heat generation and improve efficiency of the inverter 220 for driving the compressor 250 as well as the inverter 225 for driving the fan motor 255.

In addition, according to embodiments of the present disclosure, since the step-down converter is used, the voltage can be controlled from 0V in initial startup. Accordingly, a switch in front of the rectifying unit 205 for initial charging is not required.

Figure 8:
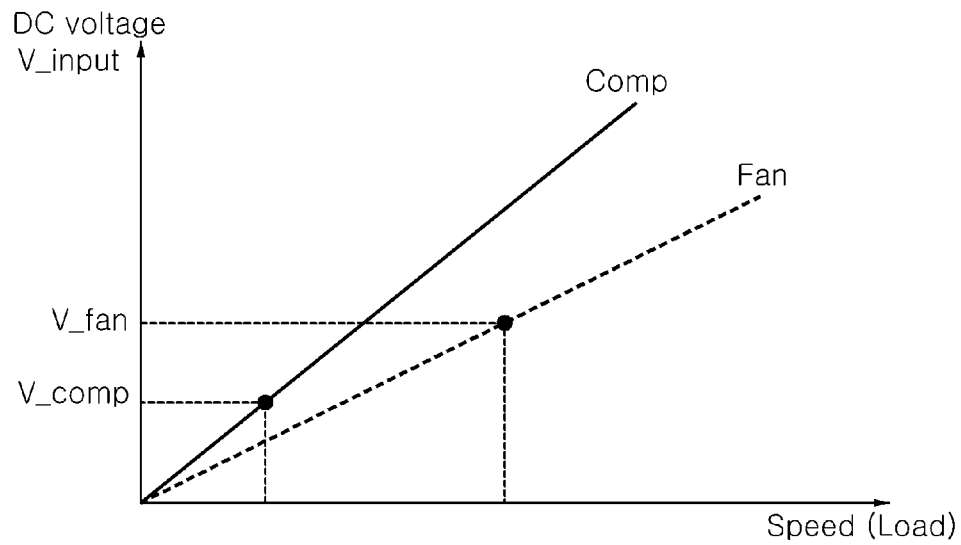
FIGS. 8 to 10 are diagrams for explaining a converter control according to an embodiment of the present disclosure.
Figure 9:
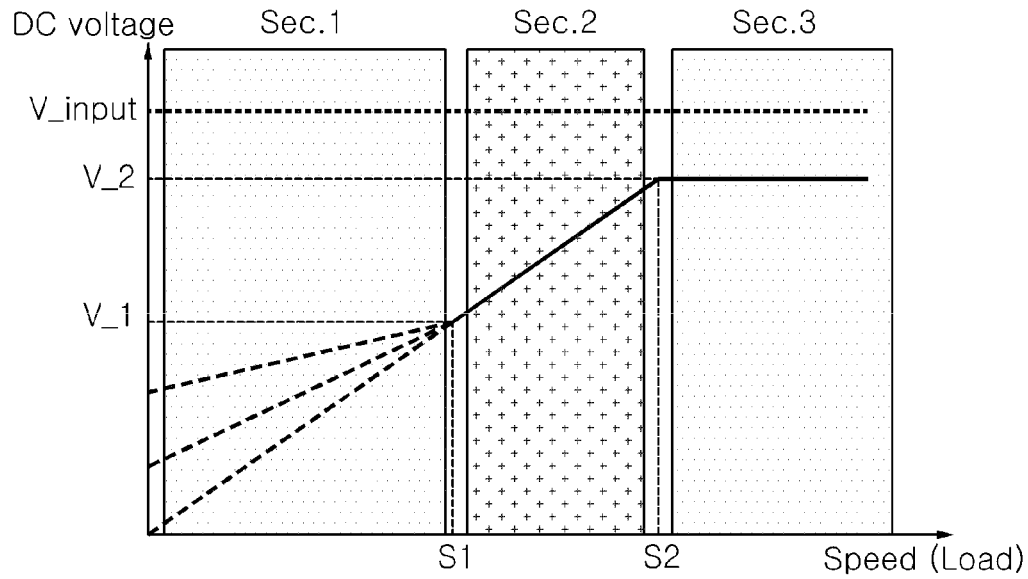
Figure 10:
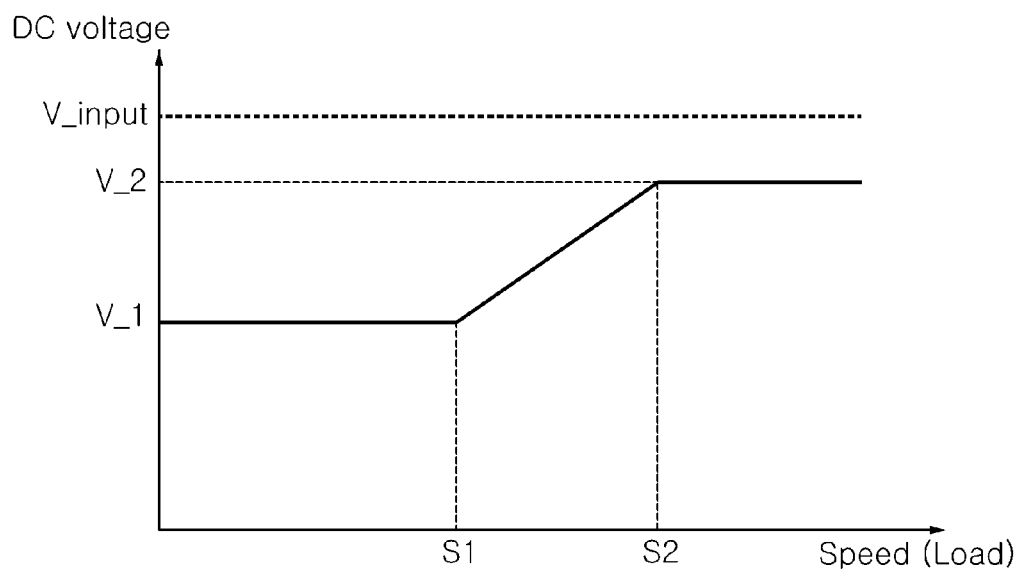

FIGS. 8 to 10 are diagrams for explaining a converter control according to an embodiment of the present disclosure.

Referring to FIG. 8, the compressor (Comp) and the fan (Fan), which are connected to the output of the buck converter 210 and the DC terminal capacitor C and share the input DC voltage (V_input) in common, have a different counter electromotive force depending on a load characteristic. Therefore, a necessary minimum DC voltage varies depending on the operating speed.

Therefore, in order to simultaneously drive the compressor motor 250 and the fan motor 255 by MTPA operation without a field weakening operation, a value greater than or equal to the minimum DC voltage required for driving each motor 250 and 255 should be selected.

According to an embodiment of the present disclosure, a minimum voltage and maximum voltage range of the input DC voltage V_input are selected under a variable condition of the input DC voltage V_input.

Referring to FIG. 9, in Section 1 (Section. 1), the DC voltage for the operation of the system may vary according to the speed of each load condition. Therefore, it can be selected as the maximum value of the minimum DC voltage value required for driving each motor 250, 255.

For example, the minimum DC voltage value V_1 is set to the minimum voltage required for driving the fan motor 255.

In general, the compressor motor 250 has a larger capacity in comparison with the load of the fan motor 255 and has a larger driving voltage because the operation area is operated at a high speed.

Accordingly, in Section 2 (Section. 2), the input DC voltage V_input varies according to the load of the compressor motor 250.

For example, in Section 2 (Section. 2), the input DC voltage V_input may be varied based on the load voltage characteristic of the compressor motor 250.

That is, in Section 2 (Section. 2), the input DC voltage V_input may be varied in proportion to the speed of the compressor motor 250.

In Section 3 (Section. 3), a value equal to or greater than the maximum voltage that the switching element of the inverter 225 for driving the fan motor 255 and the switching element of the inverter 220 for driving the compressor 250 can withstand may be selected.

Referring to FIG. 10, in the power converting apparatus according to an embodiment of the present disclosure may step down the input DC voltage V_input, which is a three-phase AC voltage that is rectified and input to the inverter 2205, 225, to an appropriate voltage value by using the buck converter 210 according to the operating condition of the compressor 250.

In general, since the fan motor 255 uses a motor having a smaller capacity in comparison with the compressor motor 250, the minimum value V_1 of the output DC voltage (V_input) of the buck converter 210 may be selected as a value equal to or greater than the minimum DC voltage required for driving each motor, in order to drive the compressor motor 250 and the fan motor 255 at the same time by MTPA operation without field weakening operation.

Accordingly, the minimum value V_1 may be determined based on a driving voltage of the fan motor 255 having a low driving voltage among the fan motor 255 and the compressor motor 250.

The maximum output voltage V_2 of the buck converter 210 may be determined as a maximum voltage that the switching element of the inverter 225 for driving the fan motor 255 and the switching element of the inverter 220 for driving the compressor 250 can withstand.

In the case of a compressor using a permanent magnet synchronous motor, a minimum DC voltage capable of performing a minimum current operation (MTPA: Maximum Torque per Ampere) is determined according to the driving speed, and the minimum DC voltage generally increases in proportion to the speed. In the case of an inverter, as the DC voltage becomes higher, the loss becomes greater in a section where the field weakening operation is not achieved. Accordingly, by controlling the output DC voltage V_input of the buck converter 210 as shown in FIG. 10, it is possible to reduce loss as much as possible while maintaining the minimum DC voltage required for operating the motor 250, 255.

Meanwhile, as the step-down ratio of the buck converter 210 becomes higher (the output DC voltage becomes lower), the loss becomes greater. Accordingly, it is preferable to consider the overall efficiency according to the DC voltage.

According to an embodiment of the present disclosure, since the input DC voltage of the inverter 220, 225 can be controlled by using the buck converter 210, the existing inverter 220, 225 can be used intactly even if the input voltage increases. Accordingly, it is possible to reduce the effort of separately developing the inverter 220, 225 and the motor 250, 255 according to the power, and improve productivity by reducing the type of managed components.

The inverters 220 and 225 are provided with a plurality of switching elements, and the cost according to an increase in withstand voltage is also increased proportionally. Therefore, manufacturing cost and management cost can be further reduced, by adjusting the converter 210 and using the inverter 220, 225 in common.

According to an embodiment of the present disclosure, since the inverter input DC voltage can be freely varied while the motor is operating, the system efficiency can be improved by controlling the DC voltage as an optimum DC voltage value according to the operating condition.

The power converting apparatus and the air conditioner having the same according to an embodiment of the present disclosure are not limited to the configuration and method of the embodiments described above, but the above embodiments may be configured by selectively combining all or part of each of the embodiments so that various modifications can be achieved.

Meanwhile, a method of operating the power converting apparatus according to an embodiment of the present disclosure and the air conditioner having the same may be implemented as code that can be read by a processor on a recording medium that can be read by the processor. The processor-readable recording medium includes all types of recording devices that store data that can be read by the processor. Further, in the processor-readable recording medium, a code that is distributed over a computer system connected through a network, and can be read by the processor in a distributed manner can be stored and executed.

According to at least one of the embodiments of the present disclosure, as the DC voltage after the input power is rectified is controlled by using a converter, it is possible to provide an efficient power converting apparatus and an air conditioner having the same in various power environments such as high voltage.

In addition, according to at least one of the embodiments of the present disclosure, as the DC voltage after the input power is rectified is controlled by using a converter, the same inverter can be used even when the input power is varied, thereby reducing design and management costs.

In addition, according to at least one of the embodiments of the present disclosure, it is possible to improve the efficiency of the inverter and the motor and reduce heat generation, by controlling the output voltage of the converter according to the load.

Further, according to at least one of the embodiments of the present disclosure, it is possible to provide a power converting apparatus capable of reducing heat generation of inverters even when an overvoltage is applied and improving efficiency, and an air conditioner having the same.

Further, according to at least one of the embodiments of the present disclosure, a maximum torque per ampere (MTPA) may be calculated, and the motor may be driven based on a current command value corresponding to the calculated maximum torque per ampere.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power converting apparatus comprising:
a rectifying unit configured to rectify an input AC power;
a buck converter that is configured to step down a voltage of the rectified power and that is configured to output DC power having the step down voltage;
a first inverter that is connected to an output terminal of the buck converter and that is configured to convert the DC power into AC power to drive a first motor;
a second inverter that is connected to the output terminal of the buck converter, that is disposed in parallel to the first inverter, and that is configured to convert the DC power into AC power to drive a second motor; and
a converter controller configured to control an output voltage of the DC power of the buck converter,
wherein the buck converter comprises:
a diode including an anode connected to the rectifying unit,
an inductor connected to a cathode of the diode,
a switching element having a first end connected to the rectifying unit and a second end connected to the inductor and the cathode of the diode, and
a capacitor having (i) a first end connected to the first inverter and the second inverter and (ii) a second end connected to the inductor.

2. The power converting apparatus of claim 1, further comprising an input capacitor connected to a node between the rectifying unit and the switching element.

3. The power converting apparatus of claim 1, wherein the converter controller is configured to control, based on a speed of at least one of the first motor or the second motor, the switching element.

4. The power converting apparatus of claim 1, wherein the converter controller is configured to control, based on a DC terminal voltage of the capacitor or a DC terminal voltage command value of the capacitor, the switching element.

5. The power converting apparatus of claim 1, wherein the converter controller is configured to determine, based on a driving voltage of each of the first motor and the second motor, a minimum value and a maximum value of the output voltage of the buck converter, and
wherein the minimum value of the output voltage is a driving voltage of a motor that has a lower driving voltage among the first and second motors, and the maximum value of the output voltage is greater than or equal to a sum of maximum driving voltages of the first motor and the second motor.

6. The power converting apparatus of claim 1, wherein the converter controller is configured to:
determine, based on a driving voltage of each of the first motor and the second motor, a range of the output voltage of the buck converter, and
control, based on a speed of a motor that has a higher driving voltage among the first motor and the second motor, the output voltage of the buck converter within the determined range of the output voltage of the buck converter.

7. The power converting apparatus of claim 6, wherein the converter controller is configured to determine, based on the driving voltage of the each of the first motor and the second motor, a minimum value and a maximum value of the output voltage of the buck converter, and
wherein the minimum value of the output voltage is a driving voltage of a motor that has a lower driving voltage among the first and second motors, and the maximum value of the output voltage is greater than or equal to a sum of maximum driving voltages of the first motor and the second motor.

8. The power converting apparatus of claim 6, further comprising:
an inverter controller configured to control an operation of switching elements of the first inverter,
wherein the inverter controller is configured to calculate a maximum torque per ampere (MTPA) based on a driving speed of the first motor, and
wherein the converter controller is configured to control the output voltage of the buck converter based on the calculated MTPA.

9. The power converting apparatus of claim 8, wherein the inverter controller comprises:
a first current command generation unit configured to generate (i) a current command value based on calculated or sensed rotor speed information of the first motor and (ii) a speed command value,
a first voltage command generation unit configured to generate, based on the generated current command value and a detected current, a voltage command value for driving the first inverter,
a first switching control signal output unit configured to output, based on the generated voltage command value, a first switching control signal for driving the first inverter, and
a maximum torque calculation unit configured to (i) calculate a maximum torque per ampere (MTPA) based on an output of the first current command generation unit and (ii) output, to the first voltage command generation unit and the converter controller, the current command value corresponding to the calculated MTPA.

10. The power converting apparatus of claim 1, further comprising an inverter controller configured to control an operation of switching elements of the first and second inverters,
wherein the inverter controller is configured to calculate, based on a driving speed of the first motor, a maximum torque per ampere (MTPA), and
wherein the converter controller is configured to control, based on the calculated MTPA, the output voltage of the buck converter.

11. The power converting apparatus of claim 10, wherein the inverter controller comprises:
first and second current command generation units each configured to generate (i) a current command value based on calculated or sensed rotor speed information of the first and second motors and (ii) a speed command value,
first and second voltage command generation units each configured to generate, based on the generated current command value and a detected current, a voltage command value for driving the first and second inverters,
first and second switching control signal output units configured to output, based on the voltage command value, first and second switching control signals for driving the first and second inverters, and
first and second maximum torque calculation units each configured to (i) calculate a maximum torque per ampere (MTPA) based on an output of each of the first and second current command generation units and (ii) output, to the first and second voltage command generation units and the converter controller, the current command value corresponding to the calculated maximum torque per ampere.

12. The power converting apparatus of claim 1, wherein the converter controller is configured to (i) calculate a maximum torque per ampere based on a driving speed of the first motor and (ii) control the output voltage of the buck converter based on the calculated maximum torque per ampere.

13. The power converting apparatus of claim 1, further comprising a maximum torque calculation unit configured to calculate a maximum torque per ampere based on a driving speed of the first motor,
wherein the converter controller is configured to control the output voltage of the buck converter based on the calculated maximum torque per ampere.

14. The power converting apparatus of claim 1, wherein the switching element provides a reflux current path for the inductor,
based on the switching element being turned on, current flowing from the switching element to the inductor through the reflux current path increases, and energy accumulates in the inductor.

15. An air conditioner comprising:
a first motor;
a second motor; and
a power converting apparatus comprising:
   a rectifying unit configured to rectify an input AC power,
   a buck converter that is configured to step down a voltage of the rectified power and that is configured to output DC power having the step down voltage,
   a first inverter that is connected to an output terminal of the buck converter and that is configured to convert the DC power into AC power to drive the first motor,
   a second inverter that is connected to the output terminal of the buck converter, that is disposed in parallel to the first inverter, and that is configured to convert the DC power into AC power to drive the second motor, and
   a converter controller configured to control an output voltage of the DC power of the buck converter,
wherein the buck converter comprises:
   a diode including an anode connected to the rectifying unit,
   an inductor connected to a cathode of the diode,
   a switching element having a first end connected to the rectifying unit and a second end connected to the inductor and the cathode of the diode, and
   a capacitor having (i) a first end connected to the first inverter and the second inverter and (ii) a second end connected to the inductor.

16. The air conditioner of claim 15, wherein the first motor is a compressor motor, and the second motor is a fan motor.

17. The air conditioner of claim 15,
wherein the converter controller is configured to control, based on a speed of at least one of the first motor or the second motor, the switching element.

18. The air conditioner of claim 15, wherein the converter controller is configured to determine, based on a driving voltage of each of the first motor and the second motor, a minimum value and maximum value of the output voltage of the buck converter,
wherein the minimum value of the output voltage is a driving voltage of a motor that has a lower driving voltage among the first and second motors, and the maximum value is greater than or equal to a sum of maximum driving voltages of the first motor and the second motor.

19. The air conditioner of claim 18, further comprising an inverter controller configured to control an operation of switching elements of the first inverter,
wherein the inverter controller is configured to calculate, based on a driving speed of the first motor, a maximum torque per ampere (MTPA), and
wherein the converter controller is configured to control the output voltage of the buck converter based on the calculated maximum torque per ampere.

20. The air conditioner of claim 15, wherein the switching element provides a reflux current path for the inductor,
based on the switching element being turned on, current flowing from the switching element to the inductor through the reflux current path increases, and energy accumulates in the inductor.

* * * * *